Figure 5:
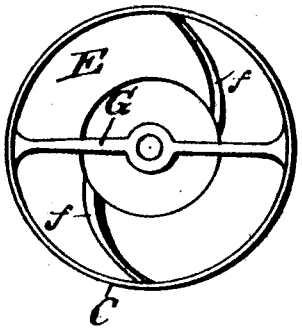
Figure 4:
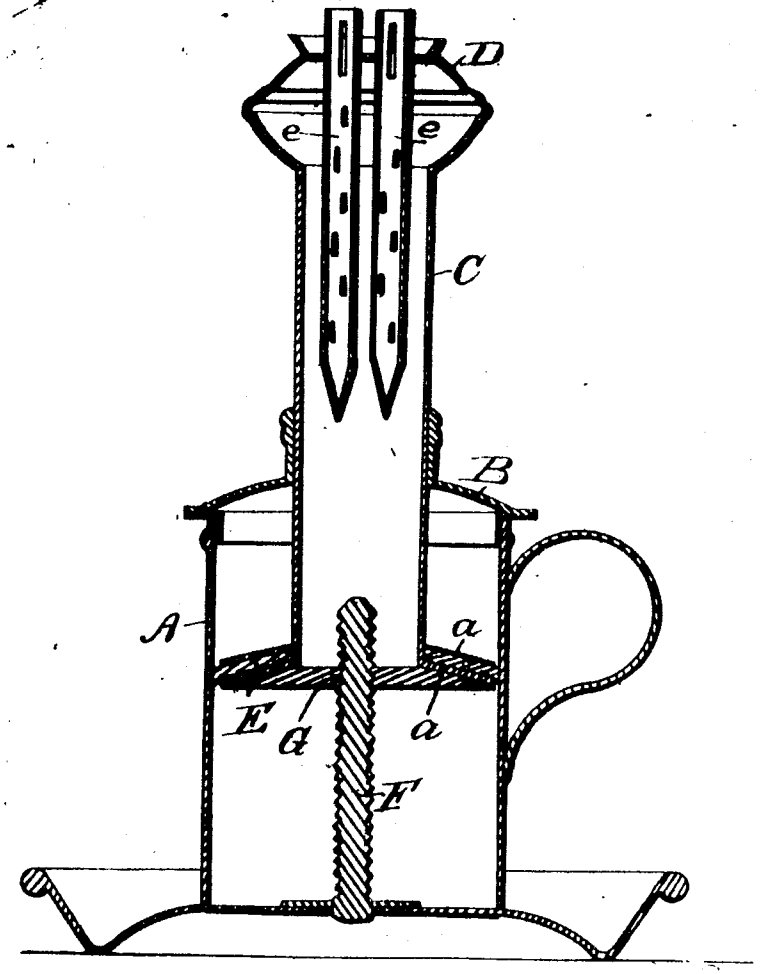

BEST AVAILABLE COPY

J. Neal.

Lard Lamp.

AI. No. 60.

Nov. 28, 1842.